3,304,333
POLYENE-1-OLS INSECT ATTRACTANTS
Ernst Truscheit and Karl Eiter, Leverkusen, Germany, assignors to Farbenfabriken Bayer Aktiengesellschaft, Leverkusen, Germany, a corporation of Germany
No Drawing. Filed June 20, 1960, Ser. No. 37,086
Claims priority, application Germany, June 23, 1959,
F 28,769
6 Claims. (Cl. 260—617)

This invention relates to unsaturated aliphatic alcohols.

In a prior application Serial No. 10,867, filed on February 25, 1960, by Butenandt et al. and now abandoned, there is described hexadecadiene-(10,12)-ol-(1) and processes for its production. For instance a synthesis of this compound is described which is characterized in that a phosphorane, formed from 1-halogeno-hexene-(2) and triphenylphosphine with a proton acceptor such as e.g. n-butyl lithium, methyl lithium, alkali metal alkoxides, alkali metal amides, alkaline earth metal alkoxides, alkaline earth metal amides, sodium acetylide and lithium acetylide, is reacted with an acylate of decanal-(10)-ol-(1), and that the conjugated unsaturated compound thus obtained is saponified with alkali, or that the above phosphorane is reacted with decanal-(10)-acid-(1)-ester and the hexadecadiene-(10,12)-acid-(1)-ester is reduced to the primary alcohol with a complex metal hydride, or that a 1-halogeno-hexene-(2) is reacted with an acylate of decanal-(10)-ol-(1) or a decanal-(10)-acid-(1)-ester and a metal such as lithium, magnesium, or zinc under the conditions of the Grignard or Reformatsky synthesis.

The above mentioned hexadecadiene-(10,12)-ol-(1) has attained importance as an insect attractant. Previously, it had not been possible to prepare a highly active substance of this class by total synthesis.

It is an object of the present invention to provide further unsaturated aliphatic alcohols having utility as insect attractants.

Further objects reside in the provision of processes for the production of such unsaturated aliphatic alcohols.

We have found that compounds having the following constitution

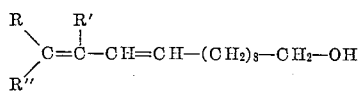

wherein R denotes a saturated or unsaturated, branched or unbranched aliphatic residue, R' is a residue such as R, hydrogen, or forms together with R a tri- or tetramethylene residue which may be substituted if desired, or an alkyl residue, and finally R'' is hydrogen or an alkyl residue, can be prepared in that phosphoranes which are produced from 1-halogeno-alkenes-(2) other than 1-halogeno-hexene-(2) and triphenylphosphine with proton acceptors, such as n-butyl lithium, methyl lithium, alkali metal alkoxides or -amides as well as alkaline earth metal alkoxides or amides, or sodium or lithium acetylide, are reacted with a 1-acyloxy-decanal-(10), and the conjugated unsaturated compounds thus obtained are saponified by alkali, or in that the above phosphoranes are reacted with decanal-(10)-acid-(1)-ester and the esters thus formed are reduced to the primary alcohols with a complex metal hydride.

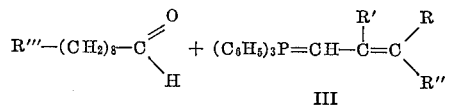

R''' is COOR$^{IV}$ is I
R''' is CH$_2$OA$_c$ is II

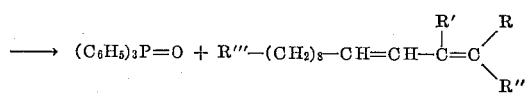

R''' is COOR'$^V$ is IV
R''' is CH$_2$OAc is V
R'V is alkyl

The carbonyl component (I) can be obtained by known methods in 85% yield on ozonization of undecylene-acid methyl esters. When the compound II is employed as the carbonyl component for the ylide synthesis, the undecylene-acid methyl ester must be converted to the unsaturated alcohol undecen-(10)-ol-(1) by means of complex metal hydrides. This alcohol is acylated in known manner. Ozonization of the acyl derivative produces the acyloxyaldehyde (II) in 85% yield.

To prepare the phosphorane III, an alcohol having the general Formula IV, wherein R, R', and R'' possess the above stated significance, is halogenated in known manner, the halide VII thus obtained is reacted with triphenylphosphine in an inert solvent to give the corresponding triphenylphosphonium halide VIII, and this is treated with a proton acceptor such as, e.g., n-butyl lithium, methyllithium, phenyl-lithium, alkali metal-acetylide, or alkali- or alkaline earth-metal alkoxide or amide. The phosphorane III thus obtained is now reacted, as indicated above, with the equivalent amount of the carbonyl components I or II, whereby the compounds IV or V, respectively, are obtained in good yields after filtering off by suction the precipitate containing triphenylphosphine-oxide, washing and drying the filtrates, and evaporating off the solvent. In most cases, these prove to be colorless liquids capable of being distilled in a high vacuum. The unsaturated aliphatic alcohols of the present invention are obtained in nearly quantitative yield by alkaline saponification of IV or by hydrogenation of V with complex metal hydrides, respectively.

The unsaturated aliphatic alcohols thus obtained constitute mixtures of geometrical isomers which can be separated by fractional crystallisation.

Alkaline saponification of compounds having the general Formula IV procedures mixtures of geometrically isomeric carboxylic acids which can be separated by fractional crystallisation. The pure isomers thus obtained, whose steric homogeneity can be proved by paper chromatography, can be reduced to the corresponding sterically homogeneous alcohols by complex metal hydrides either directly or after conversion to the esters.

Insofar as different geometrical isomers are possible, halides of the general Formula VII may be employed for the ylide synthesis in sterically homogeneous form as well as in the form of isomer mixture. The resulting unsaturated compounds of the general Formulas IV and V, and also the alcohols prepared therefrom contain a double bond in the 12-position, which has the same geometrical configuration as that present in the halide of Formula VII which was used as starting material.

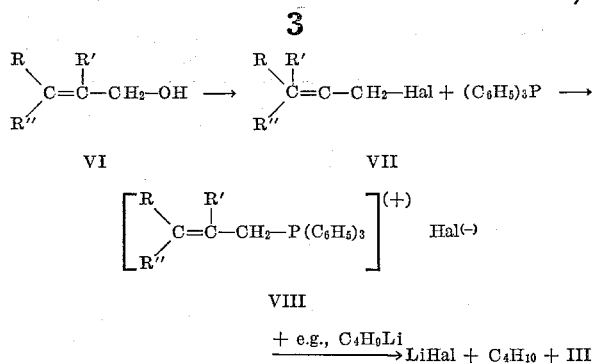

VI → VII →

+ e.g., C₄H₉Li
——————→ LiHal + C₄H₁₀ + III

Hal=Cl, Br, I.

The novel compounds according to the invention can also be obtained by reaction of a 1-halogeno-alkene-(2) other than 1-halogeno-hexene-(2) with a decanal-(10)-acid-(1)-ester in presence of lithium, magnesium, or zinc under the conditions of the Grignard or Reformatsky synthesis.

For this purpose, a 1-halogeno-alkene-(2) is converted, e.g., by lithium or magnesium, to the corresponding organometallic compound, and the compounds I or II are allowed to act on this organometallic compound.

The secondary carbinols IX thereby obtained are subjected to dehydration in known manner, e.g., with phosphorus pentoxide in an inert solvent or with phosphorus pentoxide and pyridine in an insert solvent, giving the compounds of type IV or V, respectively.

Reaction of a 1-halogeno-alkene-(2) with the carbonyl components I and II according to the manner of a Reformatsky synthesis in presence of zinc also leads to the secondary carbinols IX, which can again be converted to the compounds IV or V after dehydration, e.g., with phosphorus pentoxide in an inert solvent or with phosphorus pentoxide and pyridine in an inert solvent. In the case of the carboxylic acid ester, the end product of this synthesis is obtained by reduction with complex metal hydrides, and in the case of the acyloxy-compound by alkaline saponification.

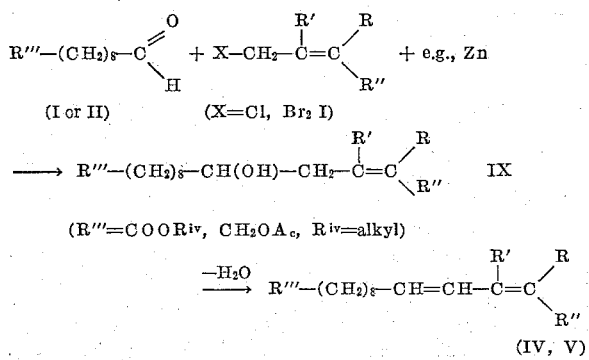

However, branched compounds of the type X and their successor products of type XI and XIII are obtained as side products of such organometallic reactions.

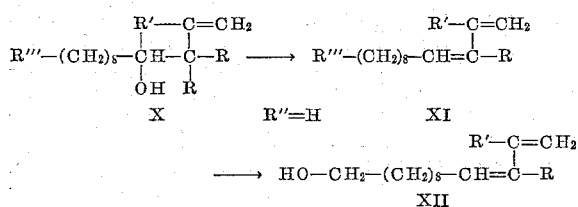

The novel compounds thus obtained are insect attractants and can therefore be added to pest control agents, particularly to insecticides. Since the attractants are active already at an extremely low concentration, tiny additions to suitable insectisides are sufficient to effect attraction of the insects.

The following formulae are cited as some examples of compounds which can be prepared according to the invention:

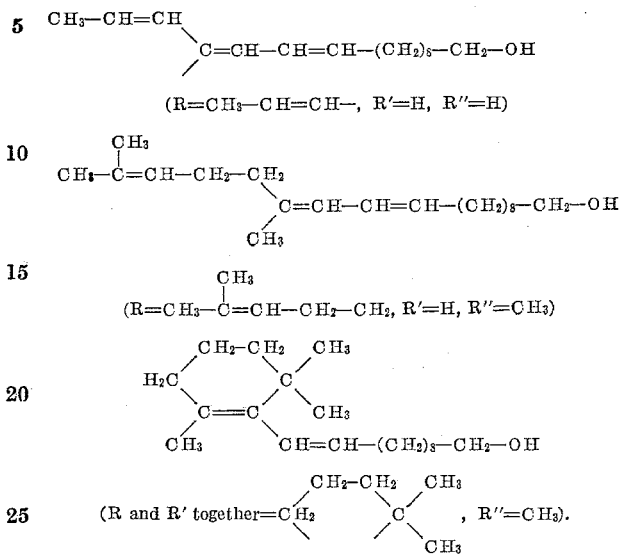

*Example 1.—Tetradecadiene-(10,12)-ol-(1)*

(a) *1-bromo-butene-(2)*.—A solution of 100 g. phosphorus tribromide in 150 ml. absolute petroleum ether (B.P. 30–50° C.) is allowed at 15° C. during one hour to run into a solution of 39 g. crotyl alcohol in 150 ml. absolute petroleum ether (B.P. 30–50° C.) with stirring and whilst passing dry carbon dioxide at the same time. The reaction mixture is allowed to remain at −15° C. for 2 hours with stirring and continued passage of carbon dioxide, and the temperature is then gradually increased to room temperature during the course of 10–12 hours. Thereupon, the reaction mixture is poured onto ice, and extracted several times with petroleum ether. The petroleum ether phase is washed with sodium chloride solution, sodium hydrogen carbonate solution, and again with sodium chloride, solution, and dried over sodium sulphate. After evaporation of the solvent, there is obtained about 68 g. (93% of theory), 1-bromo-butene-(2) of B.P. 103–105° C.; $n_D^{20}$: 1.4777.

*Analysis*.—C₄H₇Br (molecular weight: 135.02). Calculated: C, 35.59%; H, 5.23%. Found: C, 36.20%; H, 5.11%.

(b) *Triphenyl-butene-(2)-yl-phosphonium bromide*.—A solution of 60 g. pure triphenylphosphine in 200 ml. absolute benzene is treated with 30 g. 1-bromo-butene-(2), and 10–15 minutes later the mixture is refluxed for about half an hour with stirring in an atmosphere of nitrogen. The precipitated triphenyl-butene-(2)-yl-phosphonium bromide is filtered off by suction in the cold, and dried in vacuo. The yield is about 80 g. (89% of theory).

(c) *1-acetoxy-tetradecadiene-(10,12)*.—A solution of 8.6 g. n-butyl-lithium in 150 ml. absolute ether is allowed at 20–25° C. during about 30 minutes to run into a suspension of 52 g. triphenyl-butene-(2)-yl-phosphonium bromide in 230 ml. absolute ether with stirring in an atmosphere of nitrogen. This produces a blood-red solution, which after standing at room temperature for 2–3 hours is treated at 0° C. during one to two hours with a solution of 28 g. of 1-acetoxy-decanal-(10) in 90 ml. absolute ether. The reaction mixture decolorizes gradually and a yellowish precipitate separates. After stirring at 0° C. for several hours, the mixture is allowed to come gradually to room temperature, and after stirring is continued for several hours, it is treated with about 300 ml. absolute petroleum ether (B. P. 30–50° C.) to separate the triphenylphosphine-oxide completely. The precipitate is quickly filtered off by suction, and rinsed with petroleum ether. The filtrate is washed with dilute sulphuric acid and water, and dried over sodium sulphate. After evaporation of the solvent under reduced pressure, there is obtained about 28 g. crude 1-acetoxy-tetradecadiene-(10,12). From this, there is obtained by fractional distillation in a high vacuum about 3 g. of unconverted 1-acetoxy-decanal-(10) of B. P. $_{0.05}$ 95–98° C.; $n_D^{20}$: 1.4382 to 1.4435 and about 20 g. 1-acetoxy-tetradecadiene-(10,12) (68% of theory, referred to the converted 1-acetoxy-decanal-(10)) of B.P. $_{0.05}$ 116–120° C.; $n_D^{20}$ 1.4712–1.4716; $\lambda_{max}$: 230 m$\mu$ ($\epsilon$=28,000).

The infra-red absorption spectrum exhibits the absorption at 1740 cm.$^{-1}$ characteristic for ester carbonyl, the absorptions at 982 cm.$^{-1}$ and 941 cm.$^{-1}$ characteristic for cis, trans-conjugated dienes, as well as the absorption at 715 cm.$^{-1}$ characteristic for $(CH_2)_{n>4}$.

*Analysis.*—$C_{16}H_{28}O_2$ (molecular weight 252.40). Calculated: C, 76.13%; H, 11.19%; O, 12.68%. Found: C, 76.13%; H, 11.22%; O, 12.89%.

(d) *Tetradecadiene-(10,12)-ol-(1).* A solution of 8.5 g. 1-acetoxytetradecadiene-(10,12) in 40 ml. ethanol is refluxed for one hour with a solution of 2.5 g. potassium hydroxide in 10 ml. water and 70 ml. ethanol in an atmosphere of nitrogen. After the ethanol has been evaporated off almost entirely under reduced pressure, the residue is treated with water, and extracted with ether for several times. The combined ether extracts are dried over sodium sulphate, the ether is evaporated, and the residue (about 7 g.) is distilled in a high vacuum. There is obtained 6.8 g. (96% of theory) tetradecadiene-(10,12)-ol-(1) of B.P. $_{0.08}$ 110–112° C.; $n_D^{20}$: 1.4851; $\lambda_{max}$. 230 m$\mu$ ($\epsilon$=31,000). The infra-red absorption spectrum exhibits the absorption at 3300 cm.$^{-1}$ characteristic for the hydroxyl group, the absorption at 1050 cm.$^{-1}$ characteristic for C—O-valency vibration, the absorption at 978 cm.$^{-1}$ and 942 cm.$^{-1}$ characteristic for cis, transconjugated dienes, as well as the absorption at 714 cm.$^-$ characteristic for $(CH_2)_{n>4}$.

*Analysis.*—$C_{14}H_{26}O$ (molecular weight: 210.36). Calculated: C, 79.94%; H, 12.46%. Found: C, 80.17%; H, 12.12%.

(e) A solution of 5 g. of the product obtained as above in about 15 ml. petroleum ether (B.P. 30–50° C.) is cooled to about −10° C. The crystallisate which separates is filtered off by suction, the mother liquor is concentrated and again cooled to −10° C., whereby further portions of the crystallisate are obtained. The total yield is about 1.5–1.8 g. 10-trans, 12-trans-tetradecadiene-(10,12)—ol-(1) which after recrystallisation from petroleum ether (B.P. 30–50° C.) melts at 41–42° C. $\lambda_{max}$: 230 m$\mu$ ($\epsilon$=30,000). The infra-red absorption spectrum contains characteristic bands at 3300 cm.$^{-1}$ (hydroxyl group), 1060 cm.$^{-1}$ (—C-O-valency vibration), 978 cm.$^{-1}$ (trans,trans-conjugated diene), and 716 cm.$^{-1}$ $((CH_2)_{n>4})$

*Analysis.*—$C_{14}H_{26}O$ (molecular weight 210.36). Calculated C, 79.94%; H, 12.46%. Found: C, 79.64%; H, 12.47%.

The concentrated filtrates leave a product which consists mainly of 10-cis, 12-trans-tetradecadiene-(10,12)-ol-(1). B.P.$_{0.001}$ 100–115° C. air bath temperature), $n_D^{20}$: 1.4840; $\lambda_{max}$: 231 m$\mu$ ($\epsilon$=28,500). The infra-red absorption spectrum differs from that for the above described trans, trans-isomer by the absorption at 978 cm.$^{-1}$ and 942 cm.$^{-1}$ characteristic for cis, trans-conjugated dienes.

*Example 2*

(a) *Tetradecadiene - (10,12) - acid-(1)-methyl ester.*—87 ml. of a 2.82 molar solution of n-butyl-lithium in n-heptane, diluted with 100 ml. absolute ether, is allowed to run at room temperature during about 30 minutes into a suspension of 95 g. triphenyl-butene-(2)-yl-phospho-nium bromide in 90 ml. absolute ether with stirring in an atmosphere of nitrogen. After stirring at room temperature for one hour, the reaction mixture is cooled to 0° C. and then a solution of 47.5 g. decanal-(10)-acid-(1)-methyl ester (prepared according to C. R. Noller and R. Adams, J. Am. Soc., 48, 1074 (1926)) in 50 ml. absolute ether is added at 0° C. with stirring during about 30–40 minutes. The reaction mixture is allowed to remain at 0° C. for about four hours more, and at room temperature for 3 hours, and the precipitate which consists of a mixture of lithium bromide and triphenylphosphine-oxide (about 100 g. altogether) is filtered off by suction and washed with ether. The solvent is evaporated from the filtrate under reduced pressure. For complete separation of small amounts of triphenylphosphine-oxide which are still present, the residue is dissolved in about 500 ml. petroleum ether (B.P. 30–50° C.), the solution is cooled to a low temperature, and the separated triphenylphosphine-oxide is then filtered off by suction. After evaporation of the solvent under reduced pressure, there is obtained about 52 g. crude tetradecadiene-(10,12)-acid-(1)-methyl ester, and from this by distillation in a high vacuum about 39 g. (=69% of theory) pure ester of B.P.$_{0.001}°$ 120–123° C.; $n_D^{20}$: 1.4730; $\lambda_{max}$: 230 m$\mu$ ($\epsilon$=25,200). The infra-red absorption spectrum exhibits characteristic bands at 1740 cm.$^{-1}$ (ester carbonyl), 983 cm.$^{-1}$ and 942 cm.$^{-1}$ (cis, trans-conjugated dienes), 715 cm.$^{-1}$ $((CH_2)_{n>4})$.

(b) *10-trans, 12-trans - tetradecadiene - (10,12) - acid-(1).*—A solution of 25 g. of tetradecadiene-(10,12)-acid-(1)-methyl ester, obtained as described under (a), in 100 ml. ethanol is refluxed for an hour with a solution of 7.4 g. potassium hydroxide in 35 ml. water and 150 ml. ethanol under nitrogen. Thereupon, the ethanol is evaporated under reduced pressure, the residue is diluted with water, and acidified with phosphoric acid. The precipitated acid is extracted with ether, the ether solution is washed with sodium chloride solution, and dried over sodium sulphate. After evaporation of the ether under reduced pressure, there is obtained about 23 g. (=98% of theory) of a solid residue. The product is dissolved in petroleum ether (B.P. 30–50° C.) and the solution cooled to about 0° C. The 10-trans, 12-trans-tetradecadiene-(10,12)-acid-(1)-crystallises as colorless small leaves, and is filtered off by suction. Cooling of the concentrated mother liquor yields further portions of this isomer. There is obtained a total of about 8 g. (=34% of theory, referred to the employed ester) 10-trans, 12-trans-tetra-decadiene-(10,12)-acid(1) which after recrystallisation from petroleum ether (B.P. 30–50° C.) melts at 62–63° C.; $\lambda_{max}$: 228 m$\mu$ ($\epsilon$=32,000). The infra-red absorption spectrum exhibits characteristics absorptions at 1708 cm.$^{-1}$ (acid carbonyl), 987 cm.$^{-1}$ (trans,trans-conjugated diene; the relatively wide absorption at 935 cm.$^{-1}$ is characteristic for associated carboxylic acids), as well as at 715 cm.$^{-1}$ $((CH_2)_{n>4})$.

*Analysis.*—$C_{14}N_{24}O_2$ (molecular weight: 224.34). Calculated: C, 74.95%; H, 10.78%; O, 14.27%. Found: C, 74.52%; H, 10.91%; O, 14.70%.

(c) *10-trans, 12-trans-tetradecadiene-(10,12)-acid-(1)-methyl ester.*—A solution of 7.5 g. of the 10-trans,12-trans-tetradecadiene-(10,12)-acid-(1), obtained as described under (b), in 100 ml. absolute ether is treated at 0° C. with 95 ml. of an ether solution of diazomethane (15.1 mg. diazomethane/ml.) with stirring. The reaction mixture is allowed to remain at room temperature for about 30 minutes more, and the ether is then evaporated under reduced pressure. There is obtained about 7.5 g. (=94% of theory) 10-trans, 12-trans-tetradecadiene-(10,12)-acid-(1)-methyl ester of B.P.$_{0.001}$ 100° C. (air bath temperature); $n_D^{20}$: 1.4730; $\lambda_{max}$=230 m$\mu$ ($\epsilon$=31,700). The infra-red absorption spectrum conttains characteristic bands at 1742 cm.$^{-1}$ (ester carbonyl), at 985 cm.$^{-1}$ (strongly marked, trans,trans-conjugated diene; the second absorption in the range 940–950 cm.$^{-1}$ characteristic for cis,trans-conjugated dienes is entirely absent in this case), and at 722 cm.$^{-1}$ ((CH$_2$)$_{n>4}$).

Analysis.—C$_{15}$H$_{26}$O$_2$ (molecular weight: 238.38). Calculated: C, 75.57%; H, 1.00%. Found: C, 75.46%; H, 11.14%; C, 75.34%; H, 10.89%.

(d) *10-trans, 12-trans-tetradecadiene-(10,12)-ol-(1)*.—A solution of 9 g. 10-trans, 12-trans-tetradecadiene-(10,12)-acid-(1)-methyl ester in 90 ml. absolute ether is allowed to run into a solution of 1.1 g. lithium aluminum hydride in 50 ml. absolute ether in an atmosphere of nitrogen so that the reaction mixture boils slightly. The reaction mixture is refluxed for about another hour in an atmosphere of nitrogen, excess lithium aluminum hydride is reacted at room temperature with about 2 ml. ethyl acetate, dissolved in 15 ml. absolute ether, and the reaction mixture is finally decomposed at 0° C. with 10% sulphuric acid. After working up as usual, there is obtained 7.5 g. (95% of theory) 10-trans,12-trans-tetradecadiene-(10,12)-ol-(1) of M.P. 41° (from petroleum ether of B.P. 30–50° C.); λ$_{max}$: 230 mμ (ε=30,200). The infra-red absorption spectrum exhibits characteristic absorptions at 3298 cm.$^{-1}$ (hydroxyl group), 1062 cm.$^{-1}$ (—C—O-valency), 978 cm.$^{-1}$ (trans,trans-conjugated diene), and 716 cm.$^{-1}$ ((CH$_2$)$_{n>4}$).

Analysis.—C$_{14}$H$_{26}$O (molecular weight: 210.36). Calculated: C, 79.94%; H, 12.46%; O, 7.61%. Found: C, 79.99%; H, 12.53%; O, 8.12%.

(e) *10-cis, 12-trans-tetradecadiene - (10,12) - ol-(1)*.—After separation, as described under (b), of the 10-trans, 12-trans-tetradecadiene-(10,12)-acid-(1) from the isomer mixture obtained as there described, the mother liquor is evaporated to dryness, and the residue, consisting of 10-cis, 12-trans-tetradecadiene-(10,12)-acid-(1), is converted with diazomethane, as specified under (c), to 10-cis,12-trans-tetradecadiene-(10,12)-acid-(1)-methyl ester, and this is reduced with lithium aluminium hydride, as described under (d), to 10-cis, 12-trans-tetradecadiene-(10,12)-ol-(1); B.P.$_{0.001}$: 105–115° C. (air bath temperature; n$_D^{20}$: 1.4838; λ$_{max}$: 231 mμ (ε=29,000. The infrared absorption spectrum exhibits characteristic bands at 3300 cm.$^{-1}$ (hydroxy group), 1060 cm.$^{-1}$ (—C—O-valency vibration), 978 cm.$^{-1}$ and 942 cm.$^{-1}$ (cis,trans-conjugated diene) as well as at 715 cm.$^{-1}$ ((CH$_2$)$_{n>4}$).

The infra-red absorption spectrum differs from that of the end product obtained according to Example 1(d) (isomer mixture) mainly in that absorption at 942 cm.$^{-1}$ is more strongly marked (in relation to absorption at 978 cm.$^{-1}$).

*Example 3.—Hexadecatriene-(10,12,14)-ol-(1)*

(a) *1-bromo-hexadiene-(2,4)*.—Preparation in analogy to that described in detail in Example 1(a) from 53 g. hexadiene-(2,4)-ol-(1), dissolved in 20 ml. absolute petroleum ether (B.P. 30–50° C.) and 130 ml. absolute ether, and 100 g. phosphorus tribromide, dissolved in 150 ml. absolute petroleum ether (B.P. 30–50° C.) gives about 77 g. (88% of theory) 1-bromohexadiene-(2,4) of B.P. 57–59° C.; n$_D^{20}$: 1.5439.

Analysis.—C$_6$H$_9$Br (molecular weight: 161.05). Calculated: C, 44.75%; H, 5.63%. Found: C, 44.72%; H, 5.68%.

(b) *Triphenyl - hexadiene - (2,4) - yl - phosphonium bromide*.—Preparation in analogy to that described in detail in Example 1(b) from 47.5 g. triphenylphosphine, dissolved in 210 ml. absolute benzene, and 29 g. 1-bromo-hexadiene-(2,4) gives about 73 g. triphenyl-hexadiene-(2,4)-yl-phosphonium bromide in nearly quantitative yield.

(c) *1 - acetoxy-hexdecatriene-(10,12,14)*.—A solution of 11.6 g. n-butyl-lithium in 180 ml. absolute ether is allowed to run at 20–25° C. during some 30 minutes into a suspension of 72 g. triphenyl-hexadiene-(2,4)-yl-phosphonium bromide in 285 ml absolute ether with stirring in an atmosphere of nitrogen. The red solution thus obtained is allowed to remain at room temperature for about 2 hours longer in an atmosphere of nitrogen, and it is then treated at 0° C. during 1–2 hours with a solution of 35 g. 1-acetoxydecanal-(10) in 100 ml. absolute ether with stirring. The solution decolorises gradually, and a yellowish precipitate separates. After stirring at 0° C. for several hours, the reaction mixture is diluted with about 500 ml. petroluem ether (B.P. 30–50° C.), and stirring is continued at room temperature for several more hours. Finally, the reaction mixture is refluxed for another hour, and after cooling to about 0° C., the precipitate is quickly filtered off by suction, it is washed several times with petroleum ether (B.P. 30–50° C.), the filtrate is shaken with dilute sulphuric acid and water, and it is then dried over sodium sulphate. After evaporation of the solvent under reduced pressure, there is obtained about 35 g. crude 1 - acetoxyhexadecatriene - (10,12,14) (76% of theory), which is purified by distillation in a high vacuum: B.P.$_{0.001}$ 136° C.; n$_D^{20}$:1.5100; λ$_{max}$:278 mμ (ε=40,000); 267 mμ (ε=50,000); 256 mμ (ε=36,000).

The infra-red adsorption spectrum exhibits characteristic bands at: 1738 cm.$^{-1}$ (ester carbonyl); 989, 960 cm.$^{-1}$ (conjugated triene); 715 cm.$^{-1}$ ((CH$_2$)$_{n>4}$).

Analysis.—C$_{18}$H$_{30}$O$_2$ (molecular weight 278.44). Calculated: C, 77.65%; H, 10.86%; O, 11.49%. Found: C, 77.9%; H, 10.83%; O,11.67%.

(d) *Hexadecatrien - (10,12,14)-ol-(1)*.—For saponification, a solution of 8.4 g. 1-acetoxy-hexadecatriene-(10,12,14) in 60 ml. ethanol is heated to boiling under a reflux condenser for 1 hour with a solution of 2.3 g. potassium hydroxide in 10 ml. water and 70 ml. ethanol in an atmosphere of nitrogen. Thereafter, the major portion of the ethanol is evaporated under reduced pressure, and after addition of water, the residue is extracted with ether. After being washed with sodium chloride solution, the combined ether extracts are dried over sodium sulphate. After the ether has been evaporated under reduced pressure, there is obtained 7 g. of crystalline hexadecatriene-(10,12,14)-ol-(1) (98% of theory) which melts at 73–74° C. after recrystallisation from a mixture of ether and petroleum ether (B.P. 30–50° C.; λ$_{max}$=277 mμ (ε=44,000); 266 mμ (ε=56,000); 256 mμ (ε=42,000). The infra-red absorption spectrum exhibits characteristic bands at: 3300 cm.$^{-1}$ (hydroxyl group); 1067, 1043 cm.$^{-1}$ (C—O—valency vibration); 990 cm.$^{-1}$ (conjugated triene); 716 cm.$^{-1}$ ((CH$_2$)$_{n>4}$).

*Example 4.—11-(2',6',6'-trimethylcyclohexene-(1')-yl)-undecen-(10)-ol-(1)*

(a) *β-Cyclogeranyl bromide*.—By analogy to Example 1(a), 92 g. phosphorus tribromide dissolved in 200 ml. absolute ether are allowed to run at −15° C. during 1–2 hours into a solution of 105 g. β-cyclogeraniol in 200 ml. absolute ether and 200 ml. absolute petroleum ether (B.P. 30–50° C.) with stirring and whilst passing carbon dioxide at the same time. After stirring at −15° C. for 1 hour, the reaction mixture is allowed to come gradually to room temperature, and it is further stirred at room temperature for several hours with continued passage of carbon dioxide. The reaction mixture is then poured onto ice and the reaction product is extracted with ether. After being shaken with sodium hydrogen carbonate solution and sodium chloride solution, the ether phase is dried over sodium sulphate. After evaporation of the solvent, there is obtained 135 g. cyclogeneranyl bromide (91% of theory) of B.P.$_{0.1}$ 52° C.; n$_D^{20}$:1.5209.

Analysis.—C$_{10}$H$_{17}$Br (molecular weight: 217.16). Calculated: C, 55.31%; H, 7.89%; Br, 36.81%. Found: C, 55.62%; H, 7.86%; Br, 36.50%.

(b) *Triphenyl-β-cyclogeranyl-phosphonium bromide*.—A solution of 95 g. triphenylphosphine in 400 ml. absolute benzene is heated to boiling under a reflux condenser for 30 minutes with 77 g. cyclogeranyl bromide with stirring in an atmosphere of nitrogen. After addition of absolute ether, the reaction mixture is gradually cooled, and the triphenyl-β-cyclogeranyl-phosphonium bromide which separates in the form of fine crystals in almost quantitative yield (about 168 g.) is filtered off by suction and dried in vacuo.

(c) *1 - acetoxy - 11 - (2',6',6'-trimethylcyclohexene-(1')-yl)-undecene-(10)*.—A suspension of 39 g. triphenyl-β-cyclogeranyl-phosphonium bromide in 180 ml. absolute ether is gradually treated at 20–25° C. with a solution of 5.35 g. n-butyl-lithium in 100 ml. absolute ether with stirring in an atmosphere of nitrogen, whereby a red-brown solution is eventually obtained. After stirring at room temperature for several hours, this solution is treated at 0° C. during 1 hour with a solution of 16.5 g. 1-acetoxydecanal-(10) in 50 ml. absolute ether with stirring, whereupon the solution decolorises and a yellowish precipitate is formed. After stirring at 0° C. for several hours and finally at room temperature, about 400 ml. petroleum ether (B.P. 30–50° C.) are added, the reaction mixture is allowed to remain at 0° C. for another 24 hours, the precipitate is quickly filtered off by suction, it is washed with petroleum ether, and after it has been washed with dilute sulphuric acid and water, the filtrate is finally dried over a sodium sulphate. After evaporation of the solvent, there is obtained about 17.5 g. (68% of theory) 1 - acetoxy - 11 - (2',6',6' - trimethylcyclohexene-(1')-yl)-undecene-(10) of B.P.$_{0.001}$ 155–160° C.; $n_D^{20}$:1.4881; $\lambda_{max}$:239 m$\mu$ ($\epsilon$=14,500).

Characteristic bands in the infra-red absorption spectrum are located at 1745 cm.$^{-1}$ (ester carbonyl); 966 cm.$^{-1}$ (symmetrically disubstituted

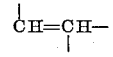

trans-ethylene bond); 717 cm.$^{-1}$ ((CH$_2$)$_{n>4}$).

*Analysis.*—C$_{22}$H$_{38}$O$_2$ (molecular weight: 334.55). Calculated: C, 78.98%; H, 11.45%. Found: C, 78.93%; H, 11.45%.

(d) *11-(2',6',6'-trimethylcyclohexene-(1')-yl) - undecene-(10)-ol-(1)*.—For saponification, a solution of 7 g. 1-acetoxy-11-(2',6',6'-trimethylcyclohexene - (1') - yl-undecene-(10) in 100 ml. ethanol is refluxed for one hour with a solution of 1.6 g. potassium hydroxide in 6 ml. water and 30 ml. ethanol in an atmosphere of nitrogen. The major portion of the ethanol is evaporated under reduced pressure, the residue is treated with water and extracted several times with ether. The ether phase which is washed with sodium chloride solution is dried over sodium sulphate. After evaporation of the solvent under reduced pressure, there is obtained 5.9 g. (96% of theory) 11-(2',6',6'-trimethylcyclohexene - (1') - yl) - undecene-(10)-ol-(1) of B.P.$_{0.001}$ 120–130° C. (air bath temperature); $n_D^{20}$: 1.4953; $\lambda_{max}$: 238 m$\mu$ ($\epsilon$=8,200).

The infrared absorption spectrum exhibits characteristic bands at: 3300 cm.$^{-1}$ (hydroxyl group); 1053$^{-1}$ (C—O-valency vibration); 966 cm.$^{-1}$ (symmetrically disubstituted

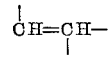

trans-ethyl-ene bond); 712 cm.$^{-1}$ ((CH$_2$)$_{n>4}$).

*Example 5*

(a) *11-(2',6',6'-trimethylcyclohexene - (1') - yl - undecene-(10)-acid - (1) - methylester*.—A suspension of 133 g. triphenyl-β-cyclogeranyl-phosphonium bromide in 550 ml. absolute ether is reacted with a solution of 18.1 g. n-butyl-lithium in 200 ml. of absolute ether as described in detail in Example 4(c). The red-brown solution thus obtained is then treated at 0° C. during 1–2 hours with a solution of 55 g. decanal-(10)-acid-(1)-methyl ester (according to C. R. Noller and R. Adams, J. Am. Soc., 48, 1074 (1926)) in 150 ml. absolute ether with stirring in an atmosphere of nitrogen, whereupon the reaction mixture decolorizes and a yellowish precipitate separates. After stirring at 0° C. for 3 hours and at room temperature for 5–6 hours, the reaction mixture is refluxed for another hour. After addition of about 800 ml. petroleum ether (B.P. 30–50° C.), the reaction mixture is allowed to remain at 0° C. for another 24 hours, the precipitate is then filtered off by suction, it is washed with petroleum ether (B.P. 30–50° C.), and the filtrate is shaken up with dilute sulphuric acid and water. After drying the organic phase over sodium sulphate, the solvent is evaporated under reduced pressure. There is obtained 64 g. of the crude product as a yellowish liquid of oily consistency. Purification is effected by fractional distillation in a high vacuum. Yield is 44 g. (53% of theory); B.P.$_{0.002}$ 155–157° C.; $n_D^{20}$: 1.4863; $\lambda_{max}$=240 m$\mu$ ($\epsilon$=11,800).

The infrared absorption spectrum exhibits characteristic bands at 1738 cm.$^{-1}$ (ester carbonyl); 965 cm.$^{-1}$ (weakly defined, symmetrically disubstituted

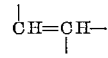

trans-ethylene bond); 714 cm.$^{-1}$ ((CH$_2$)$_{n>4}$).

*Analysis.*—C$_{21}$H$_{36}$O$_2$ (molecular weight: 320.52). Calculated: C, 78.69%; H, 11.32%. Found: C, 78.45%; H, 11.27%.

(b) *11-(2',6',6'-trimethylcyclohexene - (1') - yl) - undecene-(10) - ol - (1)*.—36 g. 11-(2',6',6'-trimethylcyclohexene - (1') - yl)-undecene - (10)-acid-(1)-methyl ester, dissolved in 220 ml. absolute ether, are added dropwise with stirring in an atmosphere of nitrogen to a solution of 3.46 g. lithium aluminium hydride in 220 ml. absolute ether, so that the reaction mixture boils vigorously. After the end of the addition, the reaction mixture is heated to boiling under a reflux condenser for 1–2 hours longer, excess lithium aluminium hydride is then removed by addition of 5 ml. ethyl acetate dissolved in 50 ml. absolute ether, and the reaction mixture is decomposed in the cold with 10% sulphuric acid. After washing with sodium hydrogen carbonate solution, the organic phase is dried over sodium sulphate. After evaporation of the solvent under reduced pressure, there is obtained about 31 g. (94% of theory) 11-(2',6',6'-trimethylcyclohexene-(1')-yl)-undecene-(10)-ol-(1) with B.P.$_{0.001}$ 120–130° C. (air bath temperature); $n_D^{20}$: 1.4963; $\lambda_{max}$: 240 m$\mu$ ($\epsilon$=11,000).

Characteristic bands can be found in the infrared absorption spectrum at: 3300 cm.$^{-1}$ (hydroxyl group); 1054 cm.$^{-1}$ (C—O-valency vibration); 965 cm.$^{-1}$ (symmetrically disubstituted

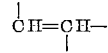

trans-ethylene bond); 712 cm.$^{-1}$ ((CH$_2$)$_{n>4}$).

*Analysis.*—C$_{20}$H$_{36}$O (molecular weight: 292.51). Calculated: C, 82.12%; H, 12.41%. Found: C, 81.92%; H, 12.25%.

*Example 6.—13,17-dimethyl-octadecatriene-(10,12,16)-ol-(1)*

(a) *Geranyl bromide*.—By analogy to Example 1(a), 32 g. tribromide dissolved in 35 ml. absolute petroleum ether are allowed to run at minus 30° C. during about 1 hour into a solution of 45 g. geraniol and 3 ml. pyridine in 100 ml. of absolute petroleum ether (B.P. 30–50° C.) with stirring and whilst passing dry carbon dioxide at the same time. After stirring at minus 30° C. for 2 hours, the reaction mixture is allowed to come gradually to about 0° C., and it is then left at 0° C. for another 1–2 hours. The reaction mixture is then poured onto ice, and the reaction product is extracted with petroleum ether. The organic phase is washed with water, dilute sulphuric acid, sodium hydrogen carbonate solution, and again with water, and then dried over calcium chloride. After the solvent has been evaporated under reduced pressure, and the residue distilled, there is obtained about 51 g. (=77% of theory) geranyl bromide of B.P.$_{0.06}$ 57–60° C., $n_D^{20}$: 1.5022.

*Analysis.*—C₁₀H₁₇Br (molecular weight: 217.16). Calculated: C, 55.31%; H, 7.89%; Br, 36.81%. Found: C, 55.55%; H, 7.84%; Br, 36.70%.

(b) *Triphenyl-geranyl-phosphonium bromide.*—A solution of 68 g. triphenylphosphine in 250 ml. absolute benzene is stirred at room temperature for about 30 minutes and at 40–50° C. for 15 minutes with 56 g. geranyl bromide in an atmosphere of nitrogen. Thereafter, chloroform is added until the precipitate has redissolved. The solution is then treated at about 30° C. with absolute ether until it is slightly turbid, and the mixture is then allowed to cool gradually so that the phosphonium bromide separates in the form of crystals. After filtering off the precipitate by suction and washing it with cold water, there is obtained about 115 g. triphenyl-geranyl-phosphonium bromide which is boiled out with 150–170 ml. acetone for final purification. M.P.: 187–189° C.

(c) *1 - acetoxy - 13,17-dimethyl-octadecatriene-(10,12, 16).*—A suspension of 90 g. triphenyl-geranyl-phosphonium bromide in 300 ml. absolute ether is treated at 20–25° C. during one hour with a solution of 16.4 g. phenyl-lithium in 350 ml. absolute ether with stirring in an atmosphere of nitrogen. After being allowed to stand at room temperature for 2 hours, the dark red solution thus obtained is treated at 0° C. during 2 hours with a solution of 42 g. 1-acetoxydecanal-(10) in 150 ml. absolute ether with stirring in an atmosphere of nitrogen. The reaction mixture is further stirred at 0° C. for 5 hours and at room temperature for another 6–7 hours, then treated with so much petroleum ether (B.P. 30–50° C.) that no further turbidity occurs, finally filtered by suction, and the precipittae is washed with petroleum ether. After being shaken with dilute sulphuric acid and water, the filtrate is dried over sodium sulphate. After the solvent has been evaporated under reduced pressure and the residue distilled, there is obtained about 35 g. (=53% of theory) 1 - acetoxy-13,17-dimethyloctadecatriene-(10,12, 16) of B.P. $_{0.001}$ 130–140°– C. (air bath temperature); $n_D^{20}$: 1.4960; $\lambda_{max}$: 240 m$\mu$($\epsilon$=40,000).

The infra-red absorption spectrum exhibits characteristic absorptions at: 1738 cm.$^{-1}$ (ester carbonyl); 859 cm.$^{-1}$ (symmertically disubstituted

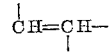

trans-ethylene bond); 718 cm.$^{-1}$ ((CH₂)$_{n>4}$).

*Analysis.*—C₂₂H₃₈O₂ (molecular weight: 334.55). Calculated: C, 78.98%; H, 11.45%; O, 9.57%. Found: C, 78.84%; H, 10.93%; O, 9.60%.

(d) *13,17 - dimethyl - octadecatriene - (10,12,16)-ol-(1).*—For saponification, a solution of 26 g. 1-acetoxy-13,17-dimethyl-octadecatriene-(10,12,16) in 260 ml. ethanol is refluxed for 1 hour with a solution of 5.7 g. potassium hydroxide and 10 ml. water in 130 ml. ethanol in an atmosphere of nitrogen. After working up as usual (see Example 1(d)), there is obtained 21 g. (=9.2% of theory) 13,17 - dimethyl-octadecatriene-(10,12,16)-ol-(1) as a colorless, viscous liquid of B.P.$_{0.001}$ 130–135° C. (air bath temperature); $n_D^{20}$: 1.5010; $\lambda_{max}$: 242 m$\mu$ ($\epsilon$=29,000).

The infra-red absorption spectrum exhibits characteristic bands at 3320 cm.$^{-1}$ (hydroxyl group); 1050 cm.$^{-1}$ (C—O-valency vibration); 959 cm.$^{-1}$ (symmetrically disubstituted

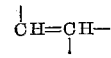

transethylene bond); 718 cm.$^{-1}$ ((CH₂)$_{n>4}$).

*Analysis.*—C₂₀H₃₆O (molecular weight: 292.51). Calculated: C, 82.12%; H, 12.41%. Found: C, 82.04%; H, 12.14%.

*Example 7.—Tetradecadiene-(10,12,)-ol-(1) as well as 11-methyl-tridecadiene-(10,12)-ol-(1)*

9.2 g. zinc dust (preferably surface activated with 2 N hydrochloric acid, washed with water, ethanol, acetone, and ether, and dried at 100° C. in vacuo) is first treated with about ⅕ part of a mixture of 18.2 g. 1-bromobutene-(2) ($n_D^{20}$: 1.4750, cf. Example 1(a)), 21.4 g. 1-acetoxydecanal-(10), and 50 ml. absolute tetrahydrofuran. The reaction is initiated by stirring and slight warming in an atmosphere of nitrogen, and the remainder of the above mentioned mixture is then allowed to run in. The reaction mixture is allowed to react further at an internal temperature of 75–80° C. for approximately 10 minutes more, and it is then decomposed in the cold by saturated ammonium chloride solution. The organic portions are extracted with ether, the combined ether extracts are washed with water and dried over sodium sulphate. After the solvent has been evaporated under reduced presence, there is obtained 24.5 g. of a pale yellow, oily substance, and from this by distillation in a high vacuum about 16.5 g. (61% of theory) of a colorless liquid of B.P.$_{0.001}$ 126–138° C., which represents a mixture of 1-acetoxy-10-hydroxy - tetradecene - (12) and 1-acetoxy-10-hydroxy-11 methyltridecene-(12), as is revealed by the infra-red absorption spectrum. It exhibits characteristic absorptions at 3445 cm.$^{-1}$ (hydroxyl group), 1737 cm.$^{-1}$ (ester carbonyl), 1632 cm.$^{-1}$, 994–988 cm.$^{-1}$, 965 cm.$^{-1}$ and 910 cm.$^{-1}$ (vinyl group and symmetrically disubstituted

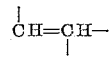

transethylene bond) as well as at 718 cm.$^{-1}$ ((CH₂)$_{n>4}$).

For dehydration, 11 g. of the ester mixture thus obtained is dissolved in 90 ml. absolute benzene and 18.5 g. absolute pyridine. 0.6 g. phosphorus pentoxide is introduced at 0° C. during 5–10 minutes into this solution with stirring in an atmosphere of nitrogen. The mixture is allowed to come gradually to room temperature, and it is then refluxed for one to two hours. After being diluted with benzene, the organic phase is extracted with ether. The combined ether extracts are washed with water, 10% sulphuric acid, again with water, then with sodium hydrogen carbonate solution, and finally dried over sodium sulphate. After the solvent has been evaporated under reduced pressure, there is obtained 9.6 g. of a yellowsih residue, and from this by distillation in a high vacuum 7.7 g. (75% of theory) of a colorless liquid of B.P.$_{0.001}$ 110–125° C. (air bath temperature); $\lambda_{max}$: 230 m$\mu$, which represents a mixture of 1-acetoxy-tetradecadiene-(10,12) and 1 - acetoxy-11-methyl-tridecadiene-(10,12). The infrared absorption spectrum exhibits characteristic absorptions at 1740 cm.$^{-1}$ (ester carbonyl), 1642 cm.$^{-1}$, 995–985 cm.$^{-1}$, 940 cm.$^{-1}$, 912 cm.$^{-1}$ (vinyl group and cis,trans-conjugated diene), as well as at 716 cm.$^{-1}$ ((CH₂)$_{m>4}$).

The same result can be obtained when dehydration is carried out with phosphorus oxychloride and pyridine or quinoline in benzene or toluene.

Saponification is carried out with 2 g. of the ester mixture thus obtained according to the method specified in Example 1 under (d). There is obtained about 1.5 g. (90% of theory) of a colorless liquid with B.P.$_{0.001}$ 115–125° C. (air bath temperature; $\lambda_{max}$: 230 m$\mu$. The infrared absorption spectrum exhibits characteristic bands at 3345 cm.$^{-1}$ (hydroxyl group), 1642 cm.$^{-1}$, 992–986 cm.$^{-1}$, 943 cm.$^{-1}$, 912 cm.$^{-1}$ (vinyl group and cis, trans-conjugated diene). It therefore represents a mixture of tetradecadiene-(10,12)-ol-(1) with 11-methyl-tridecadiene-(10,12)-ol-(1).

What is claimed is:
1. An unsaturated aliphatic alcohol having the formula:

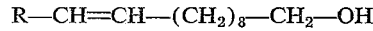

wherein R is a member selected from the group consisting of propene-(1)-yl-(1)-, pentadiene-(1,3)-yl-(1)-, 2-6-dimethylheptadiene-(1,5)-yl-(1)- and 2,6,6-trimethylcyclohexene-(1)-yl-1(1)-.
2. Tetradecadiene-(10,12)-ol-(1).
3. 10-trans-12-trans-tetradecadiene-(10,12)-ol-(1).
4. Hexadecatriene-(10,12,14)-ol-(1).
5. 11 - (2',6',6' - trimethylcyclohexene-(1')-yl)-undecene-(10-ol-(1).
6. 13,17-dimethyl-octadecatriene-(10,12,16)-ol-(1).

References Cited by the Examiner
UNITED STATES PATENTS

| | | | |
|---|---|---|---|
| 2,576,311 | 11/1951 | Schlesinger et al. | 260—618 |
| 2,879,303 | 3/1959 | Isler et al. | 260—611 |
| 2,879,304 | 3/1959 | Isler et al. | 260—611 |
| 3,072,526 | 1/1963 | Butenandt et al. | 260—638 |

FOREIGN PATENTS 526,833   6/1956   Canada.

OTHER REFERENCES

Crombie et al. Chem. Abzst., vol. 50 (1956).
Groggins, "Unit Processes in Organic Synthesis," McGraw-Hill Co., Inc. (New York), 4th edition, 1952, page 651.
Wittig et al., "Chem. Berichte," vol. 87, pages 1318–30 (1954).

BERNARD HELFIN, *Primary Examiner.*

CHARLES B. PARKER, LEON ZITVER, *Examiners.*

J. ZIEGLER, A. H. SUTTO, M. B. ROBERTO, H. G. MOORE, J. E. EVANS, *Assistant Examiners.*